United States Patent
Suzuki et al.

(10) Patent No.: US 7,511,108 B2
(45) Date of Patent: *Mar. 31, 2009

(54) PNEUMATIC TIRE

(75) Inventors: Eiju Suzuki, Kodaira (JP); Yoichi Ozawa, Kodaira (JP); Shojiro Kaita, Shiki (JP); Yasuo Wakatsuki, Shiki (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/564,727

(22) PCT Filed: Jul. 1, 2004

(86) PCT No.: PCT/JP2004/009322

§ 371 (c)(1),
(2), (4) Date: Apr. 5, 2007

(87) PCT Pub. No.: WO2005/007740

PCT Pub. Date: Jan. 27, 2005

(65) Prior Publication Data

US 2007/0179267 A1     Aug. 2, 2007

(30) Foreign Application Priority Data

Jul. 17, 2003   (JP) .............................. 2003-198616

(51) Int. Cl.
*C08F 136/06* (2006.01)
*B60C 1/00* (2006.01)
*C08L 9/00* (2006.01)
*C08F 4/72* (2006.01)

(52) U.S. Cl. .................... 526/340.4; 526/160; 526/164; 525/236; 152/209.1; 152/450; 152/525; 152/905

(58) Field of Classification Search ................. 526/164, 526/340.4, 160; 152/525, 905, 209.1, 450; 525/236

See application file for complete search history.

(56) References Cited

U.S. PATENT DOCUMENTS

| | | | | |
|---|---|---|---|---|
| 4,429,089 A | * | 1/1984 | Pedretti et al. | 526/153 |
| 5,428,119 A | * | 6/1995 | Knauf et al. | 526/153 |
| 6,046,266 A | * | 4/2000 | Sandstrom et al. | 524/492 |
| 2002/0139461 A1 | | 10/2002 | Pyle et al. | |
| 2005/0233894 A1 | * | 10/2005 | Kaita et al. | 502/152 |

FOREIGN PATENT DOCUMENTS

| EA | 1 033 265 A2 | 9/2000 |
|---|---|---|
| JP | 2001-048940 A | 2/2001 |
| JP | 2001-139633 A | 5/2001 |

OTHER PUBLICATIONS

Kaita, et al., Ultimately Specific 1,4-cis Polymerization of 1,3-Butadine with a Novel Gadolimium Catalyst, Macromolecular Rapid Communications, Feb. 2003, pp. 179-184, vol. 24, Issue 2.
Kobayashi, et al., Polymerizations of Butadiene, Isoprene, and 2,3-Dimethylbutadiene by $Gd(OCOCCl_3)_3$-$(i$-$Bu)_3Al$-$Et_2AlCl$ and the Cis Polymerization Mechanism for Dienes, Journal of Polymer Science Part A: Polymer Chemistry, Sep. 1998, pp. 2283-2290, vol. 36, Issue 13.
Kaita, et al., Highly Specific 1,4-cis Polyerization of 1,3-Butadiene, Macromolecular: Rapid Communications, 2003, pp. 179-184, vol. 24.

* cited by examiner

Primary Examiner—Fred M Teskin
(74) Attorney, Agent, or Firm—Sughrue Mion, PLLC

(57) ABSTRACT

The invention relates to a pneumatic tire having excellent mechanical properties by using a rubber composition containing a polybutadiene rubber having a high cis-1,4 bond content, a low vinyl bond content and proper number average molecular weight and molecular weight distribution, and more particularly to a pneumatic tire characterized in that a rubber composition including a polybutadiene with a cis-1,4 bond content of not less than 99.0% and a vinyl bond content of not more than 0.3% as measured by a Fourier transform infrared spectroscopy is used in any one of tire members.

7 Claims, No Drawings

PNEUMATIC TIRE

TECHNICAL FIELD

This invention relates to a pneumatic tire, and more particularly to a pneumatic tire including as a member a rubber material having excellent wear resistance and resistance to crack growth.

BACKGROUND ART

Heretofore, polybutadiene rubber has been known as a rubber having thermally and mechanically excellent properties and widely used in various fields. Particularly, since polybutadiene rubber having a high cis-1,4 bond content is excellent in the mechanical properties, the production technique of the polybutadiene rubber having the high cis-1,4 bond content has been actively studied and developed. For example, composite catalyst systems each composed mainly of a transition metal compound of nickel, cobalt, titanium or the like are known as a catalyst for the production of polybutadiene rubber. Among them, some catalysts are industrially used as a polymerization catalyst of butadiene.

As a catalyst capable of producing the polybutadiene having a high cis-1,4 bond content and having an excellent polymerization activity are developed composite catalyst systems each consisting of a rare earth metal compound and an organometal compound of Group I-III. For example, it is reported that when using a catalyst of neodymium compound and methylaluminoxane, the polymerization can be conducted in a high reactivity and a conjugated diene polymer having a narrow molecular weight distribution is obtained. However, the polymer obtained by this method is not sufficiently high in the cis-1,4 bond content and not sufficiently low in the vinyl bond content, so that the properties are still insufficient.

Also, JP-A-2001-48940 discloses that the butadiene-based polymer having a very high cis-1,4 bond content is obtained by polymerizing butadiene in a catalyst system comprising a rare earth metal compound, an organometallic compound of Group I-III and an ionic compound consisting of a non-coordinate anion and a cation. In this case, however, there are problems that a rare earth metal compound used such as $Nd(OCOCCl_3)_3$ or the like is low in the polymerization activity. Also, since NMR is utilized as a measurement of the micro-structure in JP-A-2001-48940, the error of the vinyl bond content is particularly large and further the value of the vinyl bond content in the resulting polybutadiene is large, so that the rubber composition containing such a polybutadiene is insufficient in the improvement of the properties as compared with the rubber composition containing the conventional polybutadiene. Furthermore, the polybutadiene obtained by this method tends to widen the molecular weight distribution as the vinyl bond content becomes low, so that there can not be obtained polybutadienes in which the vinyl bond content is sufficiently low and the molecular weight distribution is within a specified range.

Also, JP-A-2002-241420 discloses that the polybutadiene having a very high cis-1,4 bond content is obtained by polymerizing butadiene in a catalyst system comprising a rare earth metal salt consisting of a rare earth metal, a free halogen atom component and a halogen atom containing component and aluminoxane. In this case, however, there are problems that the polymerization activity of bis(trichloroacetic acid) (versatic acid) neodymium salt or the like used is low and the industrial productivity is low. Furthermore, JP-A-2002-241420 does not examine the vinyl bond content of the polymer at all.

In Aida, Hou, Nishiura, Doi, Kurakado, Horiuchi and Wakatsuki, *Macromol. Rapid Commun.* 2003, vol. 24, pp 179-184 is disclosed that the polybutadiene having a very high cis-1,4 bond content is obtained by polymerizing butadiene in a catalyst system comprising a metallocene complex of a gadolinium compound. However, means for controlling the molecular weight is not disclosed in the above Aida et al report, so that the practicality is low. Also, there is not examined the application of the disclosed polybutadiene to a rubber composition and the application of such a rubber composition to a rubber article, particularly a tire.

DISCLOSURE OF THE INVENTION

It is, therefore, an object of the invention to provide a pneumatic tire having excellent mechanical properties by using a rubber composition including a polybutadiene rubber being high in the cis-1,4 bond content and low in the vinyl bond content and indicating adequate number molecular weight (Mn) and molecular weight distribution (Mw/Mn).

The inventors have made various studies in order to achieve the above object and found that the wear resistance and resistance to crack growth of the tire are improved by applying a rubber composition including a polybutadiene rubber obtained by polymerizing butadiene in a specified gadolinocene catalyst system to a tread and a sidewall of the tire, and as a result, the invention has been accomplished.

That is, the pneumatic tire of the invention is characterized in that a rubber composition including a polybutadiene with a cis-1,4 bond content of not less than 99.0% and a vinyl bond content of not more than 0.3% as measured by a Fourier transform infrared spectroscopy (hereinafter abbreviated as FT-IR) is used in any one of tire members. In this case, the cis-1,4 bond content and vinyl bond content defining the polybutadiene of the invention are values measured by FT-IR, which are concretely measured by the following method.

<Analysis of Micro-structures Through FT-IR>

Using carbon disulfide as a blank in the same cell, FT-IR permeability spectrum of a solution of a butadiene-based polymer adjusted to a concentration of 5 mg/mL in carbon disulfide is measured. In this spectrum, when a mountain peak value near to 1130 cm$^{-1}$ is a and a valley peak value near to 967 cm$^{-1}$ is b, a valley peak value near to 911 cm$^{-1}$ is c and a valley peak value near to 736 cm$^{-1}$ is d, values of e, f and g are derived from the following matrix representation (II):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad \text{(II)}$$

and then cis-1,4 bond content, trans-1,4 bond content and vinyl bond content are calculated by using these values according to the following equations (III), (IV) and (V):

(cis-1,4 bond content)=$e/(e+f+g) \times 100$(%)　　(III)

(trans-1,4 bond content)=$f/(e+f+g) \times 100$(%)　　(IV)

(vinyl bond content)=$g/(e+f+g) \times 100$(%)　　(V)

Moreover, the mountain peak value a near to 1130 cm$^{-1}$ in the above spectrum indicates a base line, and the valley peak value b near to 967 cm$^{-1}$ indicates trans-1,4 bond, and the valley peak value c near to 911 cm$^{-1}$ indicates vinyl bond, and the valley peak value d near to 736 cm$^{-1}$ indicates cis-1,4 bond.

As an analysis of the microstructure of the polybutadiene has hitherto been known a method of measuring the cis-1,4 bond content, trans-1,4 bond content and vinyl bond content through $^1$H-NMR and $^{13}$C-NMR. However, in the measured result through $^{13}$C-NMR, the vinyl bond content is underestimated to become a value smaller than the actual value. On the contrary, since the polybutadiene of the invention is characterized by having a high cis-1,4 bond content and a very low vinyl bond content, it is measured by the FT-IR method in which the measuring accuracy of the vinyl bond content is high.

As the polybutadiene, it is preferable to be a polymer obtained by polymerizing 1,3-butadiene in the presence of a catalyst composed of a metallocene type cation complex of a gadolinium compound (gadolinocene catalyst). As the metallocene type cation complex of the gadolinium compound is further preferable a compound represented by the following general formula (I):

$$R^1{}_n GdX_m \qquad (I)$$

(wherein Gd is gadolinium; $R^1$ is cyclopentadienyl group, a substituted cyclopentadienyl group, indenyl group, a substituted indenyl group, fluorenyl group or a substituted fluorenyl group; X is an anion; n is an integer of 1 or 2; and m is an integer of 1 or 2).

In the rubber composition used in the pneumatic tire of the invention, it is preferable that the rubber component contains 10% by mass of the above polybutadiene. Also, the rubber composition is preferable to contain at least one of carbon black and silica in an amount of not less than 10 parts by mass in total per 100 parts by mass of the rubber component. Further, the rubber composition is preferable to be sulfur crosslinkable.

In a preferable embodiment of the pneumatic tire of the invention, the tire member is at least one of a sidewall and a tread. As a gas filling in the pneumatic tire of the invention can be used usual air or air having an adjusted oxygen partial pressure and an inert gas such as nitrogen, argon, helium or the like.

BEST MODE FOR CARRYING OUT THE INVENTION

The invention will be described in detail below. The pneumatic tire of the invention is characterized in that a rubber composition including a polybutadiene with a cis-1,4 bond content of not less than 99.0% and a vinyl bond content of not more than 0.3% as measured by FT-IR is used in any one of tire members. Since such a polybutadiene rubber is high in the cis-1,4 bond content and low in the vinyl bond content as compared with the conventional polybutadiene rubber, the extension crystallinity is considerably high, and hence the wear resistance and resistance to crack growth in the rubber composition containing such a polybutadiene rubber can be improved.

In the polybutadiene rubber, the number average molecular weight (Mn) is preferable to be 100,000-500,000 and the ratio of weight average molecular weight (Mw) to number average molecular weight (Mn) or molecular weight distribution (Mw/Mn) is preferable to be 1.3-3.5. In this case, the weight average molecular weight (Mw) and the number average molecular weight (Mn) are values converted to polystyrene as measured by a gel permeation chromatography (GPC). When the molecular weight distribution (Mw/Mn) of the polybutadiene rubber is less than 1.3, the workability of the rubber composition containing such a polybutadiene rubber is deteriorated and the milling is difficult and the properties of the rubber composition and the tire using the same can not be improved sufficiently. While, when the molecular weight distribution of the polybutadiene rubber exceeds 3.5, the viscosity of the rubber composition at an uncured state is improved, but the deterioration of the rubber properties such as hysteresis loss and the like becomes undesirably large. When the number average molecular weight of the polybutadiene rubber is less than 100,000, the modulus of elasticity in the vulcanizate lowers and the hysteresis loss rises and further the wear resistance is deteriorated, while when it exceeds 500,000, the workability of the rubber composition containing such a polybutadiene rubber is deteriorated and the milling is difficult and the properties of the rubber composition and the tire using the same can not be improved sufficiently.

As the polybutadiene rubber is preferable a polymer obtained by polymerizing 1,3-butadiene in the presence of a catalyst composed of a metallocene type cation complex of a gadolinium compound. As the metallocene type cation complex of the gadolinium compound is mentioned a trivalent gadolinium compound represented by the following general formula (I):

$$R^1{}_n GdX_m \qquad (I)$$

(wherein Gd is gadolinium; $R^1$ is cyclopentadienyl group, a substituted cyclopentadienyl group, indenyl group, a substituted indenyl group, fluorenyl group or a substituted fluorenyl group; X is an anion; n is an integer of 1 or 2; and m is an integer of 1 or 2). In the formula (I), when n is 2, two $R^1$s may be same or different, and when m is 2, two Xs may be same or different.

The kind, number and substituting position of the substituent in the substituted cyclopentadienyl group, substituted indenyl group and substituted fluorenyl group are not particularly limited. As the substituent, mention may be made of methyl group, ethyl group, n-propyl group, isopropyl group, n-butyl group, isobutyl group, sec-butyl group, tert-butyl group, hexyl group, phenyl group, benzyl group, a silicon atom-containing hydrocarbon group such as trimethylsilyl group, and so on. $R^1$ may be bonded to a part of X through a crosslinking group such as dimethylsilyl group, dimethylmethylene group, methylphenylmethylene group, diphenylmethylene group, ethylene group, substituted ethylene group or the like. Also, $R^1$s may be bonded to each other through a crosslinking group such as dimethylsilyl group, dimethylmethylene group, methylphenylmethylene group, diphenylmethylene group, ethylene group, substituted ethylene group or the like.

As the substituted cyclopentadienyl group are concretely mentioned methylcyclopentadienyl group, benzylcyclopentadienyl group, vinylcyclopentadienyl group, 2-methoxyethyl cyclopentadienyl group, trimethylsilyl cyclopentadienyl group, tert-butylcyclopentadienyl group, ethylcyclopentadienyl group, phenylcyclopentadienyl group, 1,2-dimethyl cyclopentadienyl group, 1,3-dimethyl cyclopentadienyl group, 1,3-di(tert-butyl) cyclopentadienyl group, 1,2,3-trimethylcyclopentadienyl group, 1,2,3,4-tetramethylcyclopentadienyl group, pentamethylcyclopentadienyl group, 1-ethyl-2,3,4,5-tetramethyl cyclopentadienyl group, 1-benzyl-2,3,4,5-tetramethyl cyclopentadienyl group, 1-phenyl-2,3,4,5-tetramethyl cyclopentadienyl group, 1-trimethylsilyl-2,3,4,5-tetramethyl cyclopentadienyl group, 1-trifluoromethyl-2,3,4,5-tetramethyl cyclopentadienyl group and the like. As the substituted indenyl group are mentioned 1,2,3-trimethylindenyl group, heptamethylindenyl group, 1,2,4,5, 6,7-hexmethylindenyl group and the like. Among them, pentamethylcyclopentadienyl group is preferable as $R^1$.

As the anion shown by X are mentioned tetra(phenyl)borate, tetrakis(monofluorophenyl)borate, tetrakis(difluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, tridecahydride-7,8-dicarbaundecaborate and the like.

As the metallocene type cation complex of the gadolinium compound represented by the formula (I) are concretely mentioned bispentamethyl cyclopentadienyl gadolinium tetrakis(pentafluorophenyl)borate and the like.

The metallocene type cation complex of the gadolinium compound represented by the formula (I) can be produced, for example, by reacting an ionic compound with a bivalent or trivalent gadolinium compound represented by the following general formula (VI):

(wherein Gd is gadolinium; $R^1$ is the same as mentioned above; Y is a hydrogen atom, a halogen atom, an alkoxy group, a thiolate group, an amide group or a hydrocarbon group having a carbon number of 1-20; Q is an element of Group III in the Periodic Table; p is an integer of 1, 2 or 3; and q is an integer of 0, 1 or 2). In the formula (VI), when p is 2 or 3, two or three $R^1$s may be same or different, and when q is 1 or 2, two or four Ys may be same or different.

The compound of the formula (I) may be formed by dissolving the gadolinium compound of the formula (VI) and the ionic compound in an inert solvent and reacting at 0° C. to warming, preferably room temperature for 10 minutes to several hours, preferably about 1 hour. Moreover, these reaction conditions may be properly selected or changed. By reacting two equivalent of the ionic compound with the gadolinium compound of the formula (VI is obtained a complex of the formula (I) not containing the element shown by Q in a high yield. The typical reaction example is shown as follows:

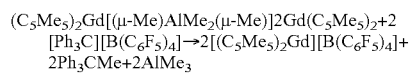

The above reaction can be carried out under an inert gas atmosphere such as nitrogen, argon or the like in an inert solvent. As the inert solvent are mentioned, for example, a saturated aliphatic hydrocarbon such as butane, pentane, hexane, heptane or the like; a saturated alicyclic hydrocarbon such as cyclopentane, cyclohexane or the like; a monoolefin such as 1-butene, 2-butene or the like; an aromatic hydrocarbon such as benzene, toluene or the like; a halogenated hydrocarbon such as methylene chloride, chloroform, carbon tetrachloride, trichloroethylene, perchloroethylene, 1,2-dichloroethane, chlorobenzene, bromobenzene, chlorotoluene or the like; and so on. Among them, toluene is preferable. Also, the above solvents may be used alone or in a combination of two or more.

The resulting complex of the formula (I) may be used in the polymerization reaction after it is taken out as a solid from the complex forming reaction system through a usual isolation operation, or the complex forming reaction system of the complex of the formula (I) may be used as it is. Moreover, when the complex forming reaction system is used in the polymerization reaction as it is, a solvent suitable for the polymerization reaction is used as an inert solvent used in the complex forming reaction, whereby the exchange of the solvent or the like can be omitted.

In the formula (VI), $R^1$ is the same as mentioned above and is cyclopentadienyl group, a substituted cyclopentadienyl group, indenyl group, a substituted indenyl group, fulorenyl group or a substituted fluorenyl group. The kind, number and substituting position of the substituent and presence or absence of the crosslinking and preferable example of $R^1$ are the same as mentioned above. Moreover, $R^1$ in the formula (VI) may be properly selected in accordance with the complex of the formula (I).

As the alkoxy group shown by Y are mentioned aliphatic alkoxy groups such as methoxy group, ethoxy group, propoxy group, n-butoxy group, isobutoxy group, sec-butoxy group, tert-butoxy group and the like; and aryloxy groups such as phenoxy group, 2,6-di-tert-butylphenoxy group, 2,6-diisopropylphenoxy group, 2-tert-butyl-6-isopropylphenoxy group, 2-tert-butyl-6-neopentylphenoxy group, 2-isopropyl-6-neopentylphenoxy group and the like. Among them, 2,6-di-tert-butylphenoxy group is preferable.

As the thiolate group shown by Y are mentioned aliphatic thiolate groups such as thiomethoxy group, thioethoxy group, thiopropoxy group, thio-n-butoxy group, thioisobutoxy group, thio-sec-butoxy group, thio-tert-butoxy group and the like; and arylthiolate groups such as thiophenoxy group, 2,6-di-tert-butylthiophenoxy group, 2,6-diisopropylthiophenoxy group, 2-tert-butyl-6-isopropylthiophenoxy group, 2-tert-butyl-6-neopentylthiophenoxy group, 2-isopropyl-6-neopentylthiophenoxy group, 2,4,6-triisopropylthiophenoxy group and the like. Among them, 2,4,6-triisopropylthiophenoxy group is preferable.

As the amide group shown by Y are mentioned aliphatic amide groups such as dimethylamide group, diethylamide group, diisopropylamide group and the like; and arylamide groups such as phenylamide group, 2,6-di-tert-butylphenylamide group, 2,6-diisopropylphenylamide group, 2,6-dineopentylphenylamide group, 2-tert-butyl-6-isopropylphenylamide group, 2-tert-butyl-6-neopentylphenylamide group, 2-isopropyl-6-neopentylphenylamide group, 2,4,6-tert-butylphneylamide group and the like. Among them, 2,4,6-tert-butylphenylamide group is preferable.

As the halogen atom shown by Y are mentioned fluorine atom, chlorine atom, bromine atom and iodine atom. Among them, chlorine atom and iodine atom are preferable.

As the hydrocarbon group having a carbon number of 1-20 shown by Y are mentioned straight or branched aliphatic hydrocarbon groups such as methyl group, ethyl group, n-propyl group, isopropyl group, n-butyl group, isobutyl group, sec-butyl group, tert-butyl group, neopentyl group, hexyl group, octyl group and the like; aromatic hydrocarbon groups such as phenyl group, tolyl group, naphthyl group and the like; aralkyl groups such as benzyl group and the like; and silicon atom-containing hydrocarbon groups such as trimethylsilylmethyl group, bistrimethylsilylmethyl group and the like. Among them, methyl group, ethyl group, isobutyl group and trimethylsilylmethyl group are preferable.

As Y in the formula (VI) are preferable a hydrogen atom, a halogen atom and a hydrocarbon group having a carbon number of 1-20.

Q in the formula (VI) is an element of Group III in the Periodic Table and concretely includes boron, aluminum, gallium and the like. Among them, aluminum is preferable.

As the gadolinium compound of the formula (VI) is concretely mentioned dimethylaluminum(µ-dimethyl)bis(pentamethylcyclopentadienyl)gadolinium.

On the other hand, the ionic compound consists of a non-coordinate anion and a cation and is not particularly limited as far as it is an ionic compound capable of forming the complex of the formula (I) by reacting with the gadolinium compound of the formula (VI).

As the non-coordinate anion are mentioned tetra(phenyl) borate, tetrakis(monofluorophenyl)borate, tetrakis(difluorophenyl)borate, tetrakis(trifluorophenyl)borate, tetrakis(pentafluorophenyl)borate, tetrakis(tetrafluorophenyl)borate, tetra(tolyl)borate, tetra(xylyl)borate, (triphenyl, pentafluorophenyl)borate, [tris(pentafluorophenyl), phenyl]borate, tridecahydride-7,8-dicarbaundecaborate and the like.

As the cation are mentioned carbonium cation, oxonium cation, ammonium cation, phosphonium cation, cycloheptatrienyl cation, phelocenium cation containing a transition metal, and so on. As the carbonium cation are mentioned triphenylcarbonium cation, a tri-substituted carbonium cation such as tri-substituted phenylcarbonium cation or the like, and so on. As the tri-substituted phenylcarbonium cation are concretely mentioned tri(methylphenyl)carbonium cation, tri(dimethylphenyl)carbonium cation and the like. As the ammonium cation are mentioned a trialkylammonium cation such as trimethylammonium cation, triethylammonium cation, tripropylammonium cation, tributylammonium cation, tri(n-butyl)ammonium cation or the like; a N,N-dialkylanilinium cation such as N,N-diethylanilinium cation, N,N-2,4,6-pentamethylanilinium cation or the like; and a dialkylammonium cation such as di(isopropyl)ammonium cation, dicyclohexylammonium cation or the like. As the phosphonium cation are mentioned triarylphosphonium cations such as triphenylphosphonium cation, tri(methylphenyl)phosphonium cation, tri(dimethylphenyl)phosphonium cation and the like.

The ionic compound can be preferably used by optionally selecting and combining from the non-coordinate anions and the cations. As the ionic compound are preferable, for example, triphenylcarbonium tetrakis(pentafluorophenyl) borate, triphenylcarbonium tetrakis(tetrafluorophenyl)borate, N,N-dimethylanilinium tetrakis(pentafluorophenyl)borate, 1,1'-dimethylferrocenium tetrakis(pentafluorophenyl) borate and the like. The above ionic compounds may be used alone or in a combination of two or more. As the Lewis acid capable of forming the cationic transition metal compound by reacting with the transition metal compound can be used $B(C_6F_5)_3$, $Al(C_6F_5)_3$ and the like, which can be combined with the ionic compound.

The addition amount of the catalyst consisting of the metallocene type cation complex of the gadolinium compound is approximately equal to the addition amount of the usual catalyst. The above catalyst can be used in the polymerization of butadiene in the presence of the organoaluminum compound. As the organoaluminum compound are mentioned a trialkylaluminum such as trimethylaluminum, triethylaluminum, triisobutylaluminum or the like, and a mixture thereof. Among them, triisobutylaluminum is preferable, and a mixture of trimethylaluminum and tributylaluminum may be used. In case of using the complex produced in the presence of the organoaluminum compound, the amount of the organoaluminum used is the same as mentioned above. As to the complex used by adding to the polymerization reaction system at a solid state or as to the complex used by adding to the polymerization reaction system a solution obtained by dissolving the complex of solid state, the amount of the organoaluminum compound used is not particularly limited, but it is sufficient to be not less than 2 equivalent per the complex of the formula (I) and it is preferable to be about 2 equivalent.

The polymerization reaction may be carried out in the presence of the solvent or the absence of the solvent. The solvent used is not particularly limited as far as it is substantially inert in the polymerization reaction and has a sufficient solubility against butadiene and the catalyst composition. As the solvent are concretely mentioned a saturated aliphatic hydrocarbon such as butane, pentane, hexane, heptane or the like; a saturated alicyclic hydrocarbon such as cyclopentane, cyclohexane or the like; a monoolefin such as 1-butene, 2-butene or the like; an aromatic hydrocarbon such as benzene, toluene or the like; a halogenated hydrocarbon such as methylene chloride, chloroform, carbon tetrachloride, trichloroethylene, perchloroethylene, 1,2-dichloroethane, chlorobenzene, bromobenzene, chlorotoluene or the like; and so on. Among them, toluene is preferable. Also, the solvents may be used alone or in a combination of two or more.

The polymerization temperature in the polymerization reaction is not particularly limited, but is −100 to 100° C., preferably −50 to 80° C., more preferably not higher than 0° C. Also, the polymerization time is not particularly limited, but it is about 1 minute to 12 hours, preferably about 5 minutes to 5 hours. These reaction conditions may be properly selected in accordance with the kind of the catalyst. After the polymerization reaction reaches to a given conversion, a well-known shortstop is added to the polymerization reaction system to stop the reaction and then the resulting polymer can be isolated from the polymerization reaction system by the usual manner.

In a preferable embodiment, the polymerization is carried out by adding the catalyst of the formula (I) at a solid state or a solution obtained by dissolving the catalyst of the formula (I) of solid state to the polymerization reaction system and further introducing the organoaluminum compound and butadiene monomer into the polymerization reaction system. However, the addition order of the catalyst, organoaluminum compound and butadiene monomer may be changed properly.

In another preferable embodiment, the gadolinium compound capable of forming the catalyst of the formula (I) is reacted with the ionic compound, and the reaction product can be used without isolation. In this case, the necessary organoaluminum compound may be added to the reaction system at any stage before the polymerization. This catalyst solution is introduced into the polymerization reaction system together with butadiene monomer to conduct the polymerization. In this case, the addition order of the catalyst solution and the butadiene monomer may be changed properly. In this embodiment, it is not necessary to isolate the resulting catalyst of the formula (I) at a solid state, so that there is a merit that the steps is omitted by one stage.

In the rubber composition used in the pneumatic tire of the invention, it is preferable that the content of the polybutadiene rubber in the rubber component is not less than 10% by mass. When the content of the polybutadiene rubber in the rubber component of the rubber composition is less than 10% by mass, the effect of improving the wear resistance and resistance to crack growth in the rubber composition is small. Also, as the rubber component of the rubber composition can be used natural rubber (NR), styrene-butadiene copolymer rubber (SBR), polyisoprene rubber (IR) and the like in addition to the above polybutadiene rubber (BR).

The rubber composition is preferable to be compounded with not less than 10 parts by mass in total of at least one of carbon black and silica as a filler per 100 parts by mass of the rubber component. When carbon black and silica are included in an amount of not less than 10 parts by mass in total, the reinforcing property is more improved.

Also, the rubber composition is preferable to be sulfur crosslinkable. A vulcanized rubber obtained by crosslinking the rubber composition with sulfur has a sufficient strength as a tire member. Moreover, the rubber composition containing the above polybutadiene rubber is excellent in the wear resistance, so that it is suitable as a tread of the tire. Also, the rubber composition is excellent in the resistance to crack growth, so that it is suitable as a sidewall of the tire.

In addition to the above rubber component, carbon black and silica, the rubber composition may be compounded with additives usually used in the rubber industry such as other filler, vulcanizing agent, vulcanization accelerator, antioxidant, scorch retarder, softening agent, zinc oxide, stearic acid, silane coupling agent, and the like within a range not damaging the object of the invention. As the additive can be preferably used commercially available ones. Moreover, the rubber composition can be produced by compounding the rubber component with properly selected additives and then milling, warming, extruding and the like.

The pneumatic tire of the invention is not particularly limited as far as the above rubber composition is used in any member. As such a member are mentioned a tread, a sidewall and the like, which may be produced by the usual manner.

The following examples are given in illustration of the invention and are not intended as limitations thereof.

POLYMER PRODUCTION EXAMPLE 1

By the method described in JP-A-2001-48940 is prepared bispentamethylcyclopentadienyl gadolinium tetrakis(pentafluorophenyl)borate $[[(Cp^*)_2GD][B(C_6F_5)_4]$, Cp*: pentamethylcyclopentadienyl ligand]. 6.6 g of this compound is charged into a pressure glass bottle of 1 liter sufficiently dried in an inert gas atmosphere and dissolved in 500 mL of toluene. Then, 30 mL of 1 M triisobutylaluminum/toluene is added and the pressure glass bottle is sealed with a crown cap provided with rubber plug to prepare a catalyst solution A. Into a polymerization reactor device of 5 liters provided with a temperature regulating jacket passing a coolant of −20° C. is introduced 1300 g of a toluene solution of 1,3-butadiene adjusted to 12.5% by mass, which is sufficiently cooled and added with all amount of the catalyst solution A. After the polymerization reaction is conducted at −20° C. for 1 hour, 5 mL of a 5% solution of an antioxidant BHT in methanol is added to stop the reaction, and further the reprecipitation is carried out in ethanol containing a slight amount of hydrochloric acid. The separated polymer is dried in air in a draft and then dried in a vacuum oven of 60° C. for 4 hours to obtain 150 g of a polymer A in a yield of 92%.

POLYMER PRODUCTION EXAMPLE 2

In a pressure glass bottle of 1 liter sufficiently dried in an inert gas atmosphere are charged 2.58 g of dimethylaluminum(μ-dimethyl)bis(pentamethylcyclopentadienyl)gadolinium $[(Cp^*)_2Gd(\mu-Me)_2AlMe_2$, Cp*: pentamethylcyclopentadienyl ligand] and 4.61 g of triphenylcarboniumtetrakis(pentafluorophenyl)borate $[[Ph_3C][B(C_6F_5)_4]]$, which are dissolved in 500 mL of toluene. To the resulting solution is added 25 mL of a toluene solution of 1M triisobutylaluminum, which is maturated at room temperature for 1 hour to obtain a catalyst solution B. In a polymerization reactor device of 5 liters provided with a temperature regulating jacket passing a coolant of −40° C. is charged 1080 g of a toluene solution of 1,3-butadiene adjusted to 12.5% by mass, which is sufficiently cooled and added with all amount of the catalyst solution B cooled to −78° C. After the polymerization reaction is conducted at −40° C. for 3 hours, 5 mL of a 5% solution of an antioxidant BHT in methanol is added to stop the reaction, and further the reprecipitation is carried out in ethanol containing a slight amount of hydrochloric acid. The separated polymer is dried in air in a draft and then dried in a vacuum oven of 60° C. for 4 hours to obtain 133 g of a polymer B in a yield of approximately 100%.

POLYMER PRODUCTION EXAMPLE 3

A catalyst solution C is prepared in the same manner as in the preparation of the catalyst solution B except that the addition amount of toluene solution of 1M triisobutylaluminum is 50 mL. By using this solution is carried out the same polymerization operation as in Polymer Production Example 2 to obtain a 117.8 g of a polymer C in a yield of 87%.

POLYMER PRODUCTION EXAMPLE 4

In a pressure glass bottle of 150 milliliters sufficiently dried in an inert gas atmosphere are charged 125 mg of bis(1-isopropyl-2,3,4,5-tetramethylcyclopentadienyl)bistetrahydrofuran samarium $[(C_5Me_4{}^iPr)_2Sm(THF)_2]$, 34 mL of MMAO-3A (made by Toso Fienchem Co., Ltd. pure product) and 564 mL of cyclohexane in this order, and further the resulting solution is maturated at room temperature for 3 hours to obtain a catalyst solution D. In a polymerization reactor device of 5 liters is charged 3200 g of a cyclohexane solution of 1,3-butadiene adjusted to 12.5% by mass in an inert gas atmosphere and a temperature regulating jacket is heated to 50° C. To this solution is added 23.3 mL of the catalyst solution D to conduct the polymerization reaction for 3 hours. Then, 5 mL of a 5% solution of an antioxidant BHT in methanol is added to stop the reaction, and further the reprecipitation is carried out in ethanol containing a slight amount of hydrochloric acid. The separated polymer is dried in air in a draft and then dried in a vacuum oven of 60° C. for 4 hours to obtain 364 g of a polymer D in a yield of 91%.

The properties of the thus obtained polymers A-D are shown in Table 1. Moreover, the analysis of the microstructure is carried out by the above FT-IR. Also, the number average molecular weight (Mn), weight average molecular weight (Mw) and molecular weight distribution (Mw/Mn) are measured by using a refractometer as a detector through GPC (made by Toso Co., Ltd. HLC-8020) and represented by polystyrene conversion using a monodisperse polystyrene as a standard. Moreover, the column is GMHXL (made by Toso Co., Ltd.) and the eluting solution is tetrahydrofuran.

TABLE 1

|  | Polymer A | Polymer B | Polymer C | Polymer D |
| --- | --- | --- | --- | --- |
| Mn | 417 × 10³ | 381 × 10³ | 257 × 10³ | 296 × 10³ |
| Mw/Mn | 1.49 | 1.88 | 2.06 | 1.97 |
| Measurement | | FT-IR | | |
| cis-1,4 bond (%) | 99.28 | 99.58 | 99.35 | 98.19 |
| vinyl bond (%) | 0.18 | 0.03 | 0.14 | 0.93 |

As seen from Table 1, the cis-1,4 bond content and vinyl bond content of the resulting polymers A-C are within the ranges defined in the invention, respectively. Furthermore, when comparing the polymers B and C obtained in Polymer Production Examples 2 and 3, the molecular weight can be controlled by changing the addition amount of triisobutylaluminum. Moreover, the polymer D obtained in Polymer Production Example 4 is low in the cis- 1,4 bond content and high in the vinyl bond content because the metallocene type complex of the gadolinium compound is not used.

As a comparison of the measurement, the above FT-IR analysis and the following $^1$H-NMR and $^{13}$C-NMR analyses are carried out with respect to commercially available polybutadiene rubber and the polymer F, whereby the difference between the analytical values based on the difference of the measurement is confirmed. The results are shown in Table 2.

<Analysis of Microstructure Through $^1$H-NMR and $^{13}$C-NMR>

The cis-1,4 bond content, trans-1,4 bond content and vinyl bond content are determined by measuring a ratio of 1,4-bond and 1,2-bond in the polymer from $^1$H-NMR analysis (signal intensity ratio of 1,4-bond: 5.30-5.50 ppm and 1,2-bond: 4.94-5.03 ppm) and measuring a ratio of cis bond and trans bond from $^{13}$C-PST-NMR analysis (signal intensity ratio of cis bond: 25.5 ppm and trans bond: 32.8 ppm).

TABLE 2

| Measurement | BR01 *1 | | 150L *2 | |
|---|---|---|---|---|
| | FT-IR | $^1$H, $^{13}$C-NMR | FT-IR | $^1$H, $^{13}$C-NMR |
| cis-1,4 bond (%) | 96.29 | 95.49 | 97.18 | 97.24 |
| trans-1,4 bond (%) | 1.50 | 2.72 | 1.19 | 1.39 |
| vinyl bond (%) | 2.20 | 1.79 | 1.63 | 1.37 |

*1 polybutadiene rubber made by JSR Corporation
*2 polybutadiene rubber made by Ube Kosan Co., Ltd.

As seen from Table 2, when using $^1$H-NMR and $^{13}$C-NMR, the vinyl bond content is undervalued as compared with FT-IR and is smaller than the actual value.

Furthermore, a rubber composition for a tire sidewall is prepared according to a compounding recipe shown in Table 3 by using a Banbury mixer, and the tensile stress at 100% elongation and resistance to crack growth are evaluated. The results are shown in Table 3.

(1) Tensile Stress at 100% Elongation

A test specimen of JIS No. 3 is prepared from each of the rubber compositions and the tensile stress at 100% elongation thereof is measured according to JIS K6251.

(2) Resistance to Crack Growth (Side Knife Cut Test)

A tire having a tire size of 175/70R13 is prepared by applying each of the rubber compositions to a sidewall. A cut having a width of 2 mm and a depth of 2.0 mm is formed in a position corresponding to a maximum width of the tire at an angle of 45 degrees with respect to a sectional direction of the tire through a knife. Then, the tire is assembled onto a rim of 5J and run over 10,000 km by a drum test under conditions that the internal pressure 1.9 kg/cm$^2$ and the load is 405 kg and the speed is 50 km/h to measure a length of the cut grown.

TABLE 3

| | | Example 1 | Example 2 | Example 3 | Comparative Example 1 | Comparative Example 2 | Comparative Example 3 |
|---|---|---|---|---|---|---|---|
| Polymer A | parts | 60 | — | — | — | — | — |
| Polymer B | by | — | 60 | — | — | — | — |
| Polymer C | mass | — | — | 60 | — | — | — |
| Polymer D | | — | — | — | 60 | — | — |
| BR01 *1 | | — | — | — | — | 60 | — |
| 150L *2 | | — | — | — | — | — | 60 |
| Natural rubber | | 40 | 40 | 40 | 40 | 40 | 40 |
| Carbon black N330 | | 50 | 50 | 50 | 50 | 50 | 50 |
| Antioxidant 6C *3 | | 2.5 | 2.5 | 2.5 | 2.5 | 2.5 | 2.5 |
| Wax *4 | | 1 | 1 | 1 | 1 | 1 | 1 |
| Stearic acid | | 2 | 2 | 2 | 2 | 2 | 2 |
| Zinc oxide | | 3 | 3 | 3 | 3 | 3 | 3 |
| Vulcanization accelerator CZ *5 | | 0.5 | 0.5 | 0.5 | 0.5 | 0.5 | 0.5 |
| Sulfur | | 1.5 | 1.5 | 1.5 | 1.5 | 1.5 | 1.5 |
| Tensile stress at 100% elongation | MPa | 2.4 | 2.2 | 2.0 | 2.1 | 1.7 | 2.0 |
| Length of cut grown | mm | 3.1 | 2.5 | 2.3 | 8.0 | 10.4 | 11.2 |

*1, 2 same as in Table 2
*3 N-(1,3-dimethylbutyl)-N'-phenyl-p-phenylenediamine, made by Ohouchi Shinko Kagaku Co., Ltd. Noclac 6C
*4 microcrystalline wax, made by Seikou Kagaku Co., Ltd. Santite A
*5 N-cyclohexyl-2-benzothiazyl sulfenamide, made by Ohouchi Shinko Kagaku Co., Ltd. Noccelar CZ As seen from Table 3, the tires using the rubber compositions of the examples are excellent in the resistance to crack growth as compared with the tires using the rubber compositions of the comparative examples because the growth of the cur is suppressed.

Also, a rubber composition for a tire tread is prepared according to a compounding recipe shown in Table 4 by using a Banbury mixer, and the wear resistance is evaluated by the following method. The results are shown in Table 4.

(3) Wear Resistance

A tire having a tire size of 11R22.5 is prepared by applying each of the rubber compositions to a tread. The tire is actually run over 100,000 to calculate running distance/(groove depth before running–groove depth after running), which is represented by an index on the basis that Comparative Example 6 is 100. The larger the index value, the smaller the wear and the better the wear resistance.

TABLE 4

|  |  | Example 4 | Example 5 | Example 6 | Comparative Example 4 | Comparative Example 5 | Comparative Example 6 |
|---|---|---|---|---|---|---|---|
| Polymer A | parts | 40 | — | — | — | — | — |
| Polymer B | by | — | 40 | — | — | — | — |
| Polymer C | mass | — | — | 40 | — | — | — |
| Polymer D |  | — | — | — | 40 | — | — |
| BR01 *1 |  | — | — | — | — | 40 | — |
| 150L *2 |  | — | — | — | — | — | 40 |
| Natural rubber |  | 60 | 60 | 60 | 60 | 60 | 60 |
| Carbon black N330 |  | 45 | 45 | 45 | 45 | 45 | 45 |
| Antioxidant 6C *3 |  | 2 | 2 | 2 | 2 | 2 | 2 |
| Resin *6 |  | 2 | 2 | 2 | 2 | 2 | 2 |
| Stearic acid |  | 2 | 2 | 2 | 2 | 2 | 2 |
| Zinc oxide |  | 5 | 5 | 5 | 5 | 5 | 5 |
| Vulcanization accelerator CZR *7 |  | 1.5 | 1.5 | 1.5 | 1.5 | 1.5 | 1.5 |
| Sulfur |  | 1 | 1 | 1 | 1 | 1 | 1 |
| Wear resistance | index | 125 | 121 | 112 | 103 | 94 | 100 |

*1, 2, 3 same as in Tables 2 and 3
*6 Nisseki Neoresin, made by Nisseki Kagaku Co., Ltd. B-100
*7 N-cyclohexyl-2-benzothiazyl-1-sulfenamide, made by Kawaguchi Kagaku Kogyo Co., Ltd. Accel CZ-R As seen from Table 4, the wear resistance is considerably improved in the tires using the rubber compositions of the examples as compared with the tires using the rubber compositions of the comparative examples.

INDUSTRIAL APPLICABILITY

According to the invention, there can be provided tires having excellent wear resistance and resistance to crack growth by applying to any member of a tire a rubber composition containing a polybutadiene rubber obtained by polymerizing butadiene in the presence of a specified gadolinocene catalyst.

The invention claimed is:

1. A pneumatic tire, characterized in that a rubber composition including a polybutadiene with a cis- 1,4 bond content of not less than 99.0% and a vinyl bond content of not more than 0.3% as measured by a Fourier transform infrared spectroscopy is used in any one of tire members.

2. A pneumatic tire according to claim 1, wherein the polybutadiene is a polymer obtained by polymerizing 1,3-butadiene in the presence of a catalyst composed of a metallocene cation complex of a gadolinium compound.

3. A pneumatic tire according to claim 2, wherein the metallocene cation complex of the gadolinium compound is represented by the following general formula (I):

$$R^1{}_n GdX_m \qquad (I)$$

(wherein Gd is gadolinium; R1 is cyclopentadienyl group, a substituted cyclopentadienyl group, indenyl group, a substituted indenyl group, fluorenyl group or a substituted fluorenyl group; X is an anion; n is an integer of 1 or 2; and m is an integer of 1 or 2).

4. A pneumatic tire according to claim 1, wherein the tire member is a sidewall.

5. A pneumatic tire according to claim 1, wherein the tire member is a tread.

6. A pneumatic tire according to claim 1, wherein the polybutadiene has a cis-1,4 bond content of not less than 99.3 5% as measured by the Fourier transform infrared spectroscopy.

7. A pneumatic tire according to claim 1, wherein a rubber component of the rubber composition consists of said polybutadiene and natural rubber and/or polyisoprene rubber.

* * * * *